Feb. 16, 1954  G. A. TINNERMAN  2,668,998
SEPARABLE FASTENER
Original Filed Sept. 15, 1948
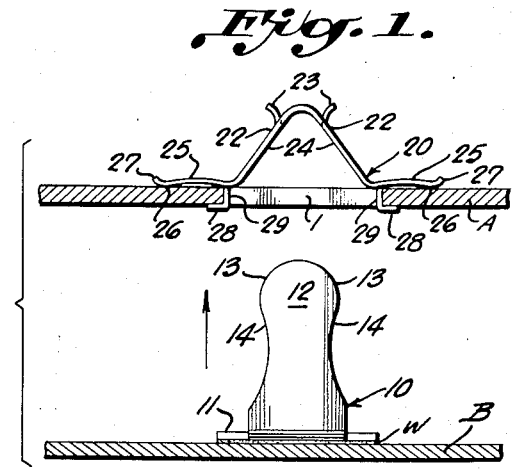
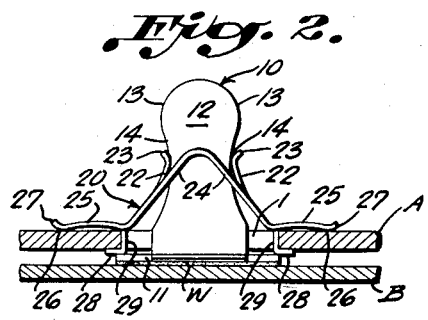
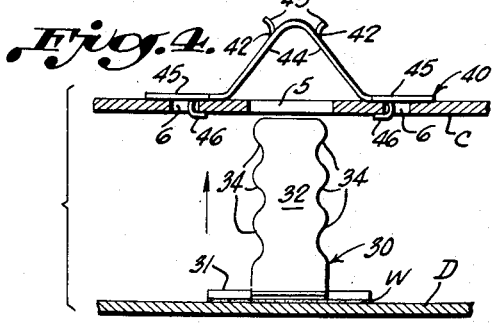
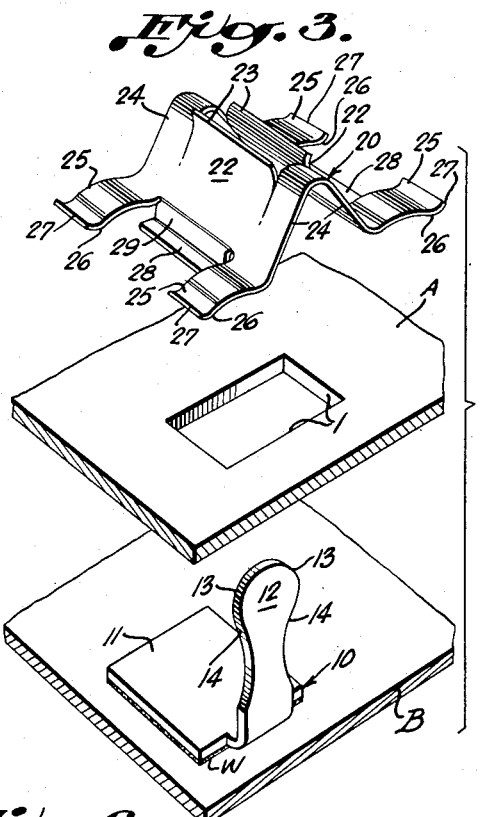
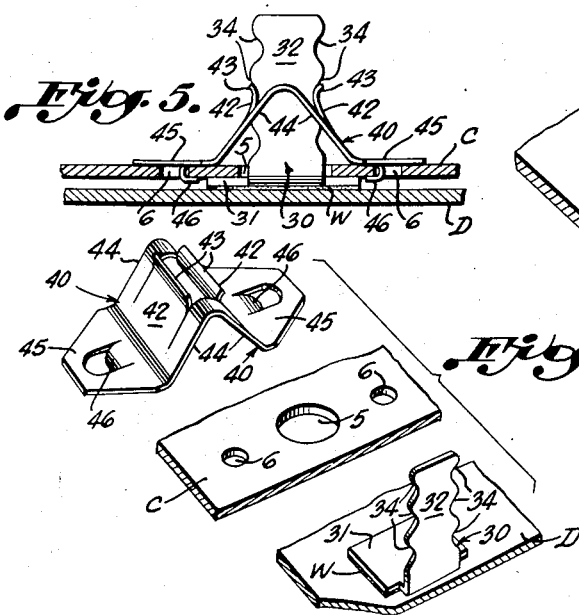
INVENTOR.
GEORGE A. TINNERMAN
BY
H. A. Lombard
ATTORNEY Patented Feb. 16, 1954

2,668,998

UNITED STATES PATENT OFFICE 2,668,998

SEPARABLE FASTENER

George A. Tinnerman, Cleveland, Ohio, assignor to Tinnerman Products, Inc., Cleveland, Ohio, a corporation of Ohio Original application September 15, 1948, Serial No. 49,412, now Patent No. 2,616,142, dated November 4, 1952. Divided and this application October 14, 1952, Serial No. 318,654

1 Claim. (Cl. 24—217)

This invention relates in general to joint constructions for panels, plates, and similar parts used in the fabrication of sheet metal structures such as cabinets, casings, and the like. This application is a division of application Serial Number 49,412 filed September 15, 1948, and issued November 4, 1952, as U. S. Patent Number 2,616,142.

The principles of the present invention find particular application in structures wherein a panel serving as a cover or closure plate, or the like, must be firmly and rigidly secured in mounted position against accidental displacement and disassociation from the supporting structure and yet capable of being readily removed to permit inspection and adjustment of working parts normally concealed thereby. In a gas range structure, for example, such a panel may assume the form of a manifold cover which conceals the manifold and associated burner valves and preferably forms a portion of the exterior surface of the range from which the panel may be readily removed for adjusting the valves, etc.

In similar and related installations, the panel may be provided in various forms for different applications and uses in the manner of a removable cover plate, door, or closure for service openings in structures wherein it is necessary or desirable to provide for quick and easy access to a normally concealed operating mechanism for inspecting or adjusting purposes, or otherwise repairing or replacing a damaged part of such operating mechanism.

A primary object of the invention is to provide a panel mounting and panel joint construction of this general character comprising an improved unitary spring fastener embodying combined securing and attaching means, the securing means being engageable with a snap stud on the panel or other object to be mounted in the manner of a spring catch for removably retaining the same in cooperation with the attaching means securing the fastener to a supporting panel or other support without the use of bolts, screws, rivets or other separate attaching means, thereby providing for important savings in the cost and application of such separate attaching means and speed and economy in mass production methods of assembly.

Another object of the invention is to provide a fastening installation of the kind described in which the improved spring fastener comprises integral hook or tongue elements adapted for positive interlocking attachment in the stud receiving opening in the support or in simple auxiliary openings therein without the use of separate attaching means, as aforesaid, and in a manner whereby the spring clip is fixedly retained under spring tension in attached position for engaging a cooperating snap stud fastener.

A further object of the invention is to provide a removable mounting for a panel or the like in which such resilient spring clip devices are adapted for ready attachment in a simple and expeditious procedure to provide a reliable and durable stud securing means for a joint or connection which is not subject to accidental loosening or displacement or unintended separation of the parts of the joint in the normal operation and use of the assembly.

An additional object of the invention is to provide improved fastening means for a panel mounting or the like, such as described, comprising cooperating spring catch and snap stud fasteners which are relatively simple in construction and both admirably suited for economical quantity production in the form of inexpensive sheet metal stampings that may be produced at comparatively low cost by conventional manufacturing operations.

Further objects and advantages, and other new and useful features in the construction, arrangement and general combination of parts of the invention will be readily apparent as the following description thereof proceeds with reference to the accompanying drawings, for purposes of illustration but not of limitation, in which like reference characters designate like parts throughout, and in which:

Fig. 1 is a sectional view showing a pair of panels or other parts in position to be secured in superposed relation by the improved fastening means of the invention;

Fig. 2 is a similar view showing the parts of the assembly in secured relation;

Fig. 3 is an exploded perspective view showing the various parts of the assembly of Figs. 1 and 2;

Fig. 4 is a sectional view similar to Fig. 1 showing a pair of panels or other parts in position to be secured in superposed relation by another form of fastening means in accordance with the invention;

Fig. 5 is a similar view showing the parts in secured relation; and

Fig. 6 is an exploded perspective view showing the various parts of the assembly of Figs. 4 and 5.

Referring now, more particularly, to the drawings the improved joint and fastening construction of the present invention is shown embodying a pair of substantial snap fastening members comprising a snap stud 10 and cooperating spring clip 20 which are attached to a pair of opposing panel or wall members A, B, to be removably secured in superposed, substantially abutting relation in an installation. The cooperating fastening devices 10, 20 may be employed on any pair of separable, abutting panel members or wall surfaces to serve, for example, as a door catch, or a means for removably mounting a panel such as manifold cover in a gas range or a toe plate for a cabinet, or the like, in which event a suitable number of the fasteners are provided for securing the panel or plate at spaced points along the path which it extends in mounted position.

In the form of the invention shown in Figs. 1-3 inclusive, the supporting part A is provided with a suitable opening 1 for each of the spring fasteners 20 to be employed. Such an opening may be formed in any desired configuration and in the present example is shown provided as a simple rectangular slot of sufficient size to serve both as a passage for the cooperating stud 10 and as a means for attaching the spring fastener 20 over such opening.

On the associated part B to be mounted or connected to the supporting part A, a cooperating snap stud 10 is provided in the form of a projecting shank or strike element designed for snap fastening engagement with the spring clip 20. Preferably, said snap stud 10 is provided by a simple sheet metal stamping having a bent end forming a base 11 for securing the stud by welding w in projecting relation to the inner side of panel B so that the outer surface of said panel is imperforate and presents a uniform, unbroken appearance. The shank of the snap stud comprises a flat, bulbous shaped head 12, the edges of which provide a blunt leading end and adjacent outwardly diverging guide surfaces 13 merging into inwardly rounded recesses which define rounded cam shoulders 14 on each edge of the snap stud.

The spring clip 20 is a relatively simple article of manufacture which may be readily produced at low cost from an inexpensive section of any suitable sheet metal, preferably tempered spring steel or cold rolled steel having springlike characteristics. The spring clip may be formed from blanks of various outlines but from the standpoint of most economical quantity production is most advantageously provided from a simple generally rectangular blank which may be obtained from standard sheet metal strip stock with little loss or waste of material. The blank or strip forming the clip is provided with a central transverse slit intermediate spaced parallel slits on opposite sides thereof to provide a pair of elongate spring arms 22 between the side or bridge portions 24 and end flanges 25. The blank as thus formed is bent into an inverted V-shape between the end flanges 25 so that said end flanges serve as base portions for the foreshortened body of the fastener. The sides 24 of the blank thus define a pair of elbows in an inverted V-shape and the spring arms 22 extend upwardly between said elbows in more or less face to face relation. The spring arms 22, accordingly, comprise opposing surface portions in resilient, yieldable, relation to each other and readily adapted to receive therebetween the cooperating snap stud 10 in snap fastening engagement therewith.

The spring clip 20 is formed with the spring arms 22 thereof inclined toward each other, as shown, and with the extremities thereof spaced a suitable distance apart and curved or rounded, as at 23, to provide substantial cam lips or shoulders adapted to permit the head of the cooperating stud to readily enter and seat therebetween on being applied thereto in one direction and to resist reverse movement in an opposite direction, but capable of being withdrawn when sufficient axial force is exerted on the stud. The spring arms 22 are supported in their inclined relation to each other by the elbows 24, and also by the base flanges 25, which fixedly secure the entire clip to the supporting panel A and thereby maintain the spring arms in operative position at all times to receive and effectively hold the cooperating snap stud therebetween.

The spring clip 20 is provided with a particularly advantageous and highly practical type of attaching means for attaching the same easily and quickly in the stud opening 1 in the supporting panel A without the use of bolts, screws, rivets or other separate fastening means. Such attaching means is provided on the base flanges 25 in the form of cooperating outwardly extending hooks or tongues 28 which are stamped from said base flanges 25 to project downwardly out of the plane thereof. The hooks 28 include spaced shoulders 29 having an initial normal spacing slightly greater than the distance between opposing end walls of the stud opening 1 in the normal untensioned condition of the clip. The hook portions 28 otherwise are so spaced from the base portions 25 as to cooperate therewith in gripping marginal portions of said opening when applied to final position. To this end, the base portions 25 preferably are slightly corrugated to define downwardly biased panel engaging cam elements 26 adjacent outwardly flared lips 27 on the extremities thereof which facilitate the application of the clip to attached position with the marginal portions of the panel opening.

The arrangement of the clip otherwise is such that in the attachment thereof in the panel opening 1, one of the hook elements 28 is first applied to gripping engagement with one end of said opening in cooperation with the cam elements 26 on the associated base 25. The flared lips 27 on the extremities of the base facilitate this initial application to a position in which the shoulder 29 of the hook is in abutting engagement with the end wall of the opening, whereupon the V-shaped body of the clip is compressed as necessary for the other hook 28 to enter the panel opening and engage the opposite end of the panel opening in a similar manner. The V-shaped body of the fastener is in slightly constricted condition in such applied position inasmuch as the shoulders 29 of the hooks have a normal spacing less than the distance between the engaged end walls of the panel opening for this purpose. Accordingly, the V-shaped body of the clip is in slightly tensioned condition in its applied final position, and this adds to and increases the spring force of the spring arms 22 in fastening engagement with the cooperating snap stud. The clip is thereby adapted for more than the usual amount of spring tension in fastening engagement with the snap stud such that there is no looseness in the joint or connection and squeaks, rattling and other objectionable noises in the completed assembly are prevented.

The resilient spring clip 20 and cooperating snap stud 10 are attached to the respective panel members A, B, with the flat shank of the stud disposed at right angles to the flat faces of the spring arms 22 of the clip so that said fastening members are thereby arranged to be moved into and out of snap fastening engagement by substantially straight longitudinal or axial movement as indicated by the arrow in Fig. 1. During this movement, by reason of the rounded, ball-shaped portion 12 of the snap stud, the diverging guide surfaces 13 on said head cause the spring arms 22 of the clip to gradually spread apart and permit said head to pass therebetween and seat the rounded cam shoulders 14 thereof on the rounded contact surfaces of the cam lips 23 on the spring arms in the secured position of the panel member A, B, substantially as shown in Fig. 2.

In this relation, the fastening members are actually secured by the rounded surfaces of the cam lip elements 23 of the spring clip in engagement with the rounded shoulders 14 on the ball-shaped head of the stud. Thus, the snap stud is adapted to effectively engage the spring arms of the clip in slight angular relationship, if necessary, in what may be termed a limited universal contact. Accordingly, should the stud and clip be somewhat misaligned to cause the strike head 12 to move one of the spring arms more than the other, such inaccuracy is readily compensated for by the engagement of the rounded surfaces of the snap stud in universal, close contact with the curved, rounded surfaces of the cam lips 23 on the spring arms. This arrangement together with the foreshortened base construction of the clip providing for the relatively long spring arms 22, prevents undue distortion and strain in the spring arms, and otherwise minimizes danger of fracture of the same by reason of crystallization incident to continuous wear over an extended period of use.

To release the stud and clip from the secured position shown in Fig. 2, a substantially axial pull on the stud causes the shoulders 14 defined by the rounded undersurfaces of the ball-type head portion 12 to cam the rounded surfaces of the cam lips 23 of the spring arms to spread the same apart and thereby permit the stud to be disassociated from the clip and easily and quickly withdrawn therefrom. Thus, in the event that it becomes necessary or desirable to remove the panel B from mounted position, as for repairs or replacement of a member concealed thereby, said panel is readily removed by a suitable force thereon to move each snap stud 10 in a reverse axial direction as necessary for the rounded cam shoulders 14 on the edges thereof to cause the spring arms 22 of the spring clip to spread apart sufficiently to pass the snap stud from engaged relation therewith. Thereafter, the panel B may be reinstalled in the same mounting in a repetition of the foregoing described procedure for applying the snap studs 10 to the associated spring clip devices 20.

Figs. 4–6 inclusive disclose another embodiment of the invention which is generally similar in construction, application and use to that described with reference to Figs. 1–3, inclusive. The fastening members in this form of the invention, likewise, are both formed as inexpensive sheet metal stampings. The snap stud 30 thus provided, is designed to be secured at any of several locations along the length thereof so that the panel or other object D may be mounted in either abutting or spaced relation to the supporting panel C. The snap stud 30, accordingly, is provided with a bent end defining a base 31 which is secured to the inner side of panel D by welding w, and a flat shank 32 having its longitudinal edges scalloped or otherwise suitably recessed to define a series of rounded cam shoulders 34.

The cooperating spring clip 40 comprises an inverted V-shaped body portion similar to that of Figs. 1–3 inclusive in which the elongate spring arms 42 having cam lips 43 on their extremities extend upwardly between the side or elbow portions 44 and end flanges 45. The end flanges 45 are provided with inwardly extending hooks or tongues 46 struck and formed therefrom to project from the underside of said base flanges. The supporting part C is prepared with a stud passage 5 and holes 6 on either side thereof for receiving said inturned hooks 46 which are provided with a predetermined spacing slightly less than the spacing of said holes 6. Accordingly, the clip is attached by inserting one of the hooks 46 in a hole 6 and seating the same in clasping relation with the engaged marginal portion of said hole, whereupon the body of the clip is distended slightly as necessary to insert the companion hook 46 in the other hole 6 and to seat the same similarly in clasping relation with the engaged marginal portion of said other hole. The body of the clip as thus distended is tensioned in attached position to add to and increase the spring force of the spring arms 22 when the stud 30 is snapped therebetween.

With the clip 40 and stud 30 attached to their respective panel members C, D, as seen in Fig. 4, the stud is advanced in the direction of the arrow in Fig. 5 through the stud passage 5 in part C into engagement with the spring arms 42 whereupon the cam lips 43 thereon ratchet over the series of shoulders 34 on the stud and seat against the pair of such shoulders at the effective point of fastening engagement to secure the panels C, D, in a completed assembly as seen in Fig. 5, for example.

The stud and clip in this form of the invention, likewise, may be readily released from secured position by suitable force providing an axial pull on the stud which causes the cam shoulders 34 on the shank thereof to ratchet pass the cam lips 43 on the extremities of the spring arms to the point at which the stud may be disassociated from the clip and withdrawn therefrom.

The spring clip devices preferably are constructed of relatively thin sheet metal, the thickness of which is selected according to service requirements and the predetermined size of the parts secured. These fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with specific examples, such examples are intended as illustrations only inasmuch as it will be apparent that other modifications in the construction, arrangement and general combination of parts may be devised without departing from the spirit and scope of the invention.

What is claimed is:

A clip comprising a piece of sheet metal having an intermediate bend providing spaced body portions for receiving a stud therebetween and base flanges adjoining said spaced body portions extending outwardly in opposite directions, resilient spring arms stamped from said spaced body portions, said spring arms being continuous with said spaced body portions from adjacent said base flanges and having free ends adjacent said intermediate bend, and inwardly extending hooks stamped from the material of said base flanges entirely within the periphery of said base flanges, said hooks projecting from the undersides of said base flanges and extending inwardly toward each other, said clip being adapted to be attached to a part over an opening therein with said base flanges bearing on one side of said part and with said hooks extending through holes adjacent said opening and engaging the opposite side of said part in cooperation with said base flanges to retain the clip in attached position on said part, said spaced body portions being adapted to be expanded and thereby tensioned in such attached position of the clip, whereby said free ends of said spring arms are biased toward each other for added gripping force on a stud applied between said spring arms, and said hooks are secured in said holes under force of said tensioned body portions urging said hooks inwardly toward each other in gripping engagement with marginal portions of said holes, and said base flanges are seated in firm bearing engagement with said part under force of said tensioned body portions to support the clip fixedly and rigidly in attached position on said part.

GEORGE A. TINNERMAN.

References Cited in the file of this patent

UNITED STATES PATENTS

| Number | Name | Date |
| --- | --- | --- |
| 2,054,471 | Tinnerman | Sept. 15, 1936 |
| 2,151,284 | Tinnerman | Mar. 21, 1939 |
| 2,400,666 | Tinnerman | May 21, 1946 |
| 2,616,142 | Tinnerman | Nov. 4, 1952 |